United States Patent
Mills et al.

(10) Patent No.: US 9,386,234 B2
(45) Date of Patent: Jul. 5, 2016

(54) AUTO FILTER EXTENT MANAGEMENT

(71) Applicant: Apple Inc., Cupertino, CA (US)

(72) Inventors: Christopher L. Mills, Saratoga, CA (US); Simon W. Butler, San Rafael, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/449,022

(22) Filed: Jul. 31, 2014

(65) Prior Publication Data

US 2016/0037085 A1   Feb. 4, 2016

(51) Int. Cl.
*H04N 5/262* (2006.01)
*H04N 5/77* (2006.01)
*G06T 3/00* (2006.01)

(52) U.S. Cl.
CPC ............ *H04N 5/2628* (2013.01); *G06T 3/0056* (2013.01); *H04N 5/772* (2013.01)

(58) Field of Classification Search
CPC ..... H04N 5/2628; H04N 5/772; G06T 3/0056
USPC ...................................................... 348/222.1
See application file for complete search history.

(56) References Cited

U.S. PATENT DOCUMENTS

| | | | |
|---|---|---|---|
| 7,920,150 B2 | 4/2011 | Ku et al. | |
| 8,645,099 B2 | 2/2014 | Min et al. | |
| 2008/0298696 A1* | 12/2008 | Kakarala | H04N 5/23245 382/238 |
| 2009/0041363 A1 | 2/2009 | Choi | |
| 2011/0090242 A1 | 4/2011 | Cote et al. | |
| 2011/0090351 A1 | 4/2011 | Cote et al. | |
| 2011/0090370 A1 | 4/2011 | Cote et al. | |
| 2011/0090371 A1 | 4/2011 | Cote et al. | |
| 2012/0081385 A1 | 4/2012 | Cote et al. | |
| 2012/0162475 A1 | 6/2012 | Lin et al. | |
| 2012/0233405 A1 | 9/2012 | Budagavi | |
| 2013/0229395 A1 | 9/2013 | Mills et al. | |
| 2013/0242126 A1* | 9/2013 | Motoda | H04N 5/3572 348/222.1 |
| 2013/0322746 A1 | 12/2013 | Cote et al. | |
| 2014/0028876 A1* | 1/2014 | Mills | H04N 5/77 348/231.99 |

OTHER PUBLICATIONS

U.S. Appl. No. 14/449,010, filed Jul. 31, 2014, D. Amnon Silverstein.
U.S. Appl. No. 14/449,011, filed Jul. 31, 2014, Suk Hwan Lim.
U.S. Appl. No. 14/449,015, filed Jul. 31, 2014, Suk Hwan Lim.

(Continued)

*Primary Examiner* — Gevell Selby
(74) *Attorney, Agent, or Firm* — Robert C. Kowert; Meyertons, Hood, Kivlin, Kowert & Goetzel, P.C.

(57) ABSTRACT

An output rescale module may determine an estimated set of lines to hold in vertical support for use when performing image transformations. For example, an output rescale module may monitor input Y coordinates (in terms of input pixel lines) computed over previous lines and compute a set of lines to hold in a set of line buffers. As each output pixel line is generated, the output rescale module may compute the minimum and maximum values of Y generated by the transform across that line. The minimum and maximum input Y coordinates may then be averaged to determine the center value (the centermost input line) for that output line. The difference (in terms of input pixel lines) between centerlines for two adjacent output lines may be added to the centerline value for the current output line to estimate a center line for the next (not yet generated) output pixel line.

20 Claims, 6 Drawing Sheets

(56) References Cited

OTHER PUBLICATIONS

U.S. Appl. No. 14/449,016, filed Jul. 31, 2014, Suk Hwan Lim.
U.S. Appl. No. 14/449,019, filed Jul. 31, 2014, Christopher L. Mills.
U.S. Appl. No. 14/449,024, filed Jul. 31, 2014, Christopher L. Mills.

* cited by examiner

AUTO FILTER EXTENT MANAGEMENT

BACKGROUND

Increasing numbers of small, mobile multipurpose devices, such as mobile phones, smartphones, tablet and/or pad devices, may include high-resolution, small form factor cameras and are capable of receiving and processing image (or video) input. Additionally, the device may be capable of performing at least some processing/rendering of the graphical input (e.g., video frames), such as format conversion, window compositing, blending, scaling, and/or color correction.

For example, when recording a scene captured frames may reflect camera motion (e.g., caused by a shaking hand, walking, or other types of disruptions). In some cases, artifact removal and/or image stabilization techniques may be applied to reduce the amount of motion exhibited in the captured images and/or to reduce the effects of motion caused by the camera's rolling shutter.

When processing an image in-stream (e.g., as it is being captured) a device may only have a limited portion of the image current available at any one time. This may limit the ability to properly process the image data. For example, there may be too little image data current available for certain type of image processing operations.

SUMMARY

An image signal processor (ISP) of a device, apparatus, or computing system that includes a camera capable of capturing video clips may, in some embodiments, be configured to apply one or more transformations (including image stabilization transformations) to image data received from the camera's image sensor. Transformations may be applied in an in-stream manner to portions of the image data by any of various components and/or modules within the image signal processor while data is still being received. For example, an output rescale module may include both horizontal and vertical scaler components. Image data may be gathered into multiple line buffers of the image signal processor, where the pixels in each line buffer correspond to a line of pixels in the input image. The vertical portion may include a series of image data line buffers to hold the "support" needed by the vertical filter. The set of line buffers may hold image pixel lines for use when performing any of various image processing operations (such as image resampling, piecewise perspective transforms and geometric distortion correction (GDC), among others). Since the ISP may be a streaming device, only the lines of image data in a finite-length sliding window of lines may be available for the filter to use.

A transformation module (e.g., a module applying image transformations), such as an output rescale module) may monitor input Y coordinates computed over previous lines (that have been processed by the vertical scaler component) and compute an estimated set of lines to hold in the vertical support window for use with a subsequent line. For each subsequent line, the output rescale module may generate a best guess (e.g., an estimate) of where to center the vertical support window.

The transformation module may determine (or compute) an estimated set of lines to hold in vertical support for use when performing transformations (e.g., image resampling, piecewise perspective transforms, GDC, etc.). For example, in some embodiments, an output rescale module may statistically monitor the input Y coordinates computed over the previous lines (e.g., image pixel lines that have already been processed by the output rescale module) and compute a set of lines to hold in vertical support (e.g., a set of line buffers). As each output pixel line is generated, the transformation module may compute the minimum and maximum values of Y generated by the coordinate transform across that line. The minimum and maximum input Y coordinates may then be averaged to determine the center of the support for that line. In other words, a transformation module may determine which line in the vertical support (e.g., the line buffers) was the centermost line of the lines used to generate the current output pixel line (e.g., as input for one or more image transformations).

A transformation module, such as an output rescale module, may compute a center value for each generated output pixel line and may determine a line-to-line step value, such as by taking difference between the center values for the current output pixel line and the center value for the output pixel line generated just prior to the current output pixel line. The line-to-line step value may be added to the center value for the current output pixel line to determine (and/or estimate) a center value for the next (not yet generated) output pixel line. The transformation module may then use the estimated center value to set the center of the available vertical support (e.g., the particular lines in the line buffers available for performing transformation when generating the next output pixel line).

Figure 1:
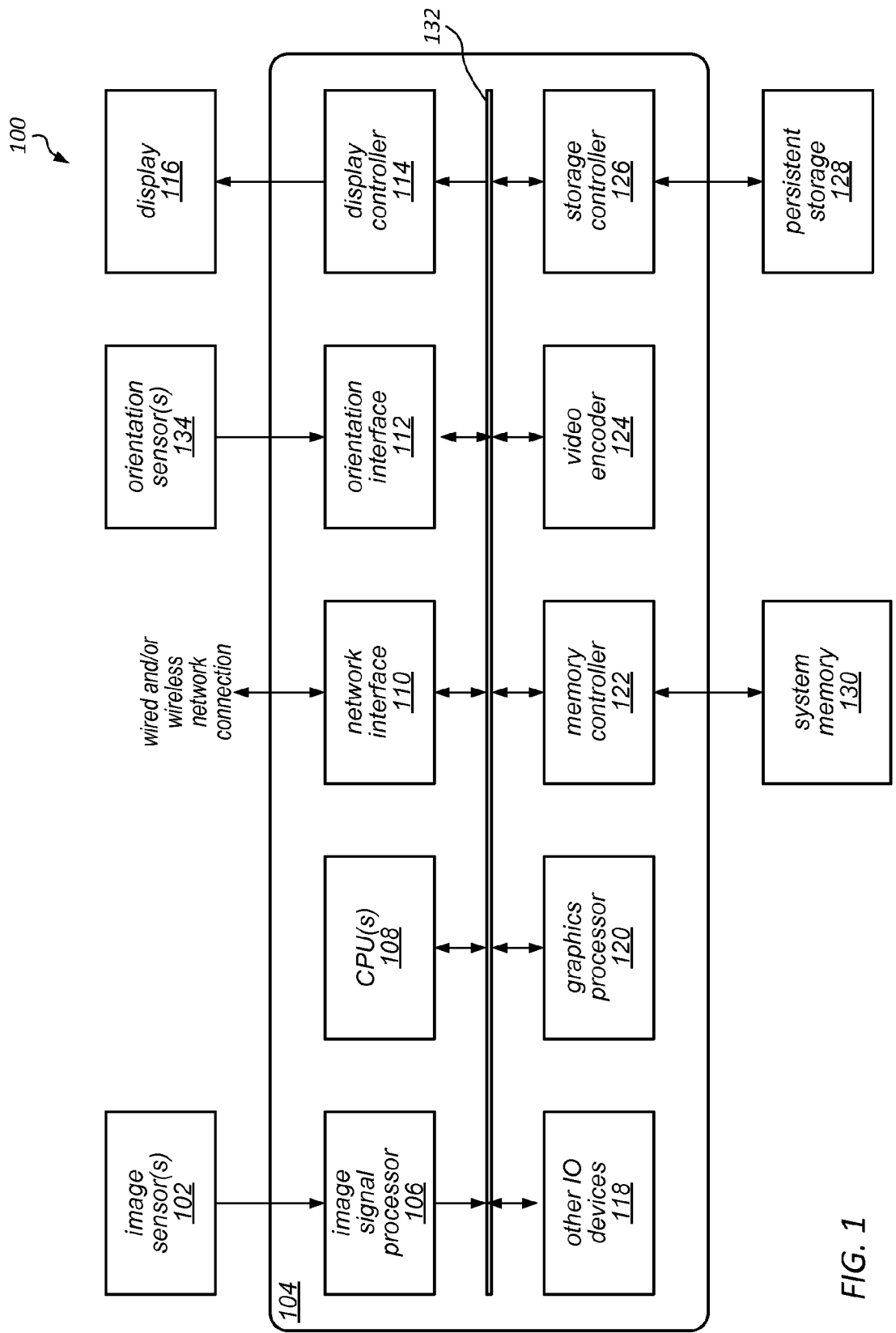
FIG. 1 is a logical block diagram illustrating an example system that may implement an image processing pipeline that performs auto filter extent management, according to some embodiments.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION OF EMBODIMENTS

As noted above, in-stream image stabilization transformations may be applied to image data to compensate for camera motion, and other artifacts, by warping the image data while the image data is received from the image sensor, according to some embodiments. Image stabilization techniques may be applied to reduce the amount of motion reflected in the images obtained from an image recording device. In some embodiments, image stabilization techniques may be used to correct image artifacts caused by camera motions (e.g., caused by a hand shaking, a foot-fall, or other disturbances) and/or to reduce the effects of the rolling shutter of the video recording device. For example, transformations may be applied in order to (at least partially) compensate for translational motion (e.g., motion of the camera to the left, right, up, and/or down), rotational motion (e.g., yaw, pitch, rolling left, or rolling right), and/or perspective distortion (e.g., distortion caused by tilting the camera slightly).

Additionally, the pixels on the image sensor of a video camera may be scanned out over time using a rolling shutter camera (e.g., a camera that scans an image line by line rather than using a shutter that opens, captures a full-frame image, and then closes). Thus, in some embodiments, one or more operations (e.g., transformations) may be performed on the captured image data to compensate for rolling shutter effects. For example, there may be a change in a scene being recorded between the time at which the top line of the image is captured and the time at which the bottom line of the image is captured, resulting in rolling shutter artifacts. Note that references to a "camera", a "video camera", or a "video recording device" in the descriptions that follow do not necessarily refer to a single-purpose device for capturing still images or video, but may refer more generally to any device, apparatus, or system that is configured to capture and process image data, including both still images and sequences of images (e.g., video clips).

In different embodiments, image stabilization may be performed in a variety of ways by the systems described herein. For instance, the system may be configured to determine the motion of the camera over the scene (or a rolling shutter artifact similar to that caused by such motion). Second, the system may adjust the image to at least partially correct the image (to compensate for the determined motion) using one or more transformations. In some embodiments, determining the motion may include receiving and using data from a gyroscope in the camera (e.g., a gyroscope that is integrated on the same device that contains the CMOS image sensor of the camera, or a gyroscope that is implemented by, for example, a separate MEMS device in the system). In other embodiments, determining the motion may include generating motion vectors based on optical flow calculations. As noted above, regardless of how the motion is determined and the corresponding motion data is generated, transformations may be applied to the resulting image to adjust for the determined motion. In other words, adjusting an image to (at least partially) compensate for determined motion may include determining how to transform the image data for the scene (e.g., what transformations to apply) to compensate for the motion. In various embodiments, these transformations may include any combination of offset translation, rotation, scaling, shear transformation and/or perspective transformation.

In some embodiments, the systems described herein are configured to apply various transformations in to different groupings of lines of pixels that correspond to lines of pixels in the image (i.e., the input image). In some embodiments, the number of lines of pixels in the line buffers may be predetermined and/or may be configurable or tunable by the user, and may be based on the desired granularity of the image stabilization operations. In other embodiments, the number of lines of pixels that are processed in the buffers may be variable within the image.

In some embodiments, image stabilization may be performed as part of the operation of the image signal processor. In other words, image stabilization operations may take advantage of the existing hardware of the image signal processor (or a modified version of the image signal processor) to perform various transformations as part of its image flow (e.g., in-stream). In some embodiments, the image signal processor may include one or more image processing filters at the end of its flow that are used to reduce the resolution of the camera input to a suitable output resolution for display as a preview or for video encoding, or for implementing a digital zoom. For example, many camera devices are configured to take both high-resolution megapixel stills and to perform lower-resolution video capture, and they include an output (or backend) scaler to down-scale the high-resolution camera input to the lower-resolution video (e.g., down-scaling input image data from 5-9 megapixels to something more suitable for video encoding).

In some embodiments, such a scaler (referred to herein as an output rescale module) may already be able to handle translations and scaling, and may be modified to perform transformations that may apply arbitrary transformations, including rotations and perspective. In other words, in some embodiments, an existing or modified image signal processor may be leveraged to perform image stabilization, e.g., by configuring it to perform other types of filtering operations (e.g., per-pixel perspective transformations) and to apply those filtering operations to different portions of an input image, according to various parameters. By performing the transformations using the image signal processor as part of the image flow through the image processing pipeline, the additional system memory operations (and corresponding bandwidth and power consumption) typically associated with image stabilization may be avoided.

The methods and techniques described herein may be performed by any of various components or modules of an ISP, according to different embodiments. However, for ease of discussion, they will mainly be described in terms of an example output rescale module.

A transformation module, such as an output rescale module, may determine (or compute) an estimated set of lines to hold in vertical support for use when performing transformations (e.g., image resampling, piecewise perspective transforms, GDC, etc.). For example, in some embodiments, an output rescale module may statistically monitor the input Y coordinates computed over the previous lines (e.g., image pixel lines that have already been processed by the output rescale module) and compute a set of lines to hold in vertical support (e.g., a set of line buffers). As each output pixel line is generated, the output rescale module may compute the minimum and maximum values of Y generated by the coordinate transform across that line. The minimum and maximum input Y coordinates may then be averaged to determine the center of the support for that line. In other words, an output rescale module may determine which line in the vertical support (e.g., the line buffers) was the centermost line of the lines used to generate the current output pixel line (e.g., as input for one or more image transformations).

An output rescale module may compute a center value for each generated output pixel line and may determine a line-to-line step value, such as by taking difference between the center values for the current output pixel line and the center value for the output pixel line generated just prior to the current output pixel line. The line-to-line step value may be added to the center value for the current output pixel line to determine (and/or estimate) a center value for the next (not yet generated) output pixel line. The output rescale module may then use the estimated center value to set the center of the available vertical support (e.g., the particular lines in the line buffers available for performing transformation when generating the next output pixel line).

Note that in some embodiments, the image signal processor may be a streaming device. In other words, pixels may be received by the image signal processor from the camera in raster order (i.e., horizontally, line by line) and may in general be processed through its various pipeline stages in raster order, until finally being written out as a completed image to memory in raster order. Therefore in order to perform a non-separable operation such as a rotation, the image signal processor may need to buffer up enough lines of the image to handle the maximum vertical displacement along the output raster scan line.

Pixel data may be received horizontally, line by line, as from a rolling shutter, in some embodiments. The image signal processor may write pixel data into multiple line buffers as it is received. For example, for each image in a sequence of images, the image signal processor may be configured to clear the line buffers and reset an output buffer pointer so that it points to the first line. Then, for each line in the image, the image signal processor may be configured to add the line to the buffers (deleting the oldest line, if necessary). Note that in some embodiments, these line buffers may be implemented within an output rescale module, which may be near the end of the image processing pipeline, such that the pixel data received from the camera sensor may be operated on by other functional units within the image signal processor before it is written into the line buffers of the output rescale module.

The output rescale module may process the pixel data in one of the line buffers (e.g., applying one or more non-warping or warping transformations, which may include image stabilization transformations), generate corresponding output pixels, and write the output pixels to system memory, according to some embodiments. For example, if there are enough input lines in the lines buffers to generate an output line, the output rescale module may be configured to generate an output line, write the generated output line to memory, and then advance the output buffer pointer to the next line. If there are more lines of pixels in the image the process may be repeated until all of the pixel data in all of the lines of a given image frame have been processed. As noted above, the line buffers may be re-loaded with pixel data multiple times for a given image frame as that pixel data is received and processed, and as the output data is written out to system memory.

As noted above, in some embodiments, there may be a certain amount of information that needs to be maintained when performing in-stream piecewise perspective transformations. For example, in some embodiments, a table of piecewise perspective transforms may be encoded as digital difference analyzer (DDA) steppers to perform per-pixel perspective transformations to correct motion related image artifacts.

In general, the transformation operation applied at each point in the image may include, for each output pixel, determining where the value of the output pixel can be found in the input image data (which may be an input pixel or may involve an interpolation between multiple input pixels, according to a fractional coordinate value), and applying a filter to resample the input image at that point to generate the output pixel.

Note that performing image stabilization operations using the image signal processor as part of its image flow may in some embodiments result in a delay in that image flow. However, in some embodiments, there may be delays for other reasons (e.g., frame delays) at various points in this flow, and any additional time to process the image due to performing image stabilization may be largely (or entirely) subsumed by those delays. In one example, the image signal processor may include a temporal filter that performs frame-to-frame comparisons, and this may cause a frame delay during which the system may gather gyroscope data or perform other operations necessary for programming the output rescaling unit to perform image stabilization when the image data reaches that stage of the image processing pipeline.

In some embodiments, the system may not necessarily be able to determine the motion of the camera before data for the entire frame has been received. However, delays earlier in the image processing pipeline may be taken advantage of, or the input from the camera sensor may be stored before it is passed to the image signal processor, which may result in a frame lag, but not necessarily a longer image processing time in the pipeline. In another example, in an embodiment in which the image signal processor includes a temporal filter, the system may be configured to detect, using the optical flow and/or gyroscopic data, what the motion vectors are as the lines of pixel data are received (e.g., before the image data for the whole image is available). In such embodiments, there may be a delay less than the time to process one frame. In another example, there may be delays due to processing and/or buffering between the stages of the image processing pipeline, which may be taken advantage of to avoid frame delays entirely (e.g., by shifting the determination of motion vectors toward the end of the image processing flow, just prior to when they are needed by the output rescaling unit to perform image stabilization transformations).

In the following detailed description, numerous specific details are set forth to provide a thorough understanding of claimed subject matter. However, it will be understood by those skilled in the art that claimed subject matter may be practiced without these specific details. In other instances, methods, apparatuses or systems are not described in detail below because they are known by one of ordinary skill in the art in order not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Example System

One example of a system that is configured to implement any or all of the techniques described herein is illustrated in FIG. 1. For example, system 100 illustrated in FIG. 1 may be configured to perform image processing using an image signal processor without the additional system memory operations required by existing GPU and CPU approaches. In the illustrated embodiment, system 100 includes an image sensor 102, a system-on-a chip (SOC) component 104, system memory (e.g., DRAM) 130, persistent storage (e.g., flash memory) 128, and a display 116 (e.g., LCD). In this example, image sensor 102 may be any type of image sensor suitable for capturing image data (e.g., an image sensor that is responsive to captured light), such as an active-pixel sensor (e.g., complementary metal-oxide-semiconductor (CMOS) active-pixel sensor) on a camera, video camera, or other device that includes a camera or video camera. In this example, display 116 may be configured to display a preview of captured still images and/or video clips. Display 116 may also be configured to display menus, selected operating parameters, or other information received from a user interface of the system (not shown). In other embodiments, other types of display devices may be included in the system for these purposes. In different embodiments, system 100 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera.

In this example, the SOC component 104 includes an image signal processor (ISP) 106, a central processor unit (CPU) 108, a network interface 110, orientation interface 112 (which may be coupled to orientation sensor(s) 134 from which system 100 orientation data, such as motion data, may be gathered), a display controller 114 (which may be coupled to and control the operations of display 116), a graphics processor (GPU) 120, memory controller 122 (which is coupled to system memory 130), a video encoder 124, a storage controller 126 (which is coupled to and controls access to persistent storage 128, such as flash memory or other non-volatile random access memory), and various other I/O devices (shown as 118), any or all of which may communicate with each other over interconnect 132. In some embodiments, system 100 and/or SOC component 104 may include more or fewer elements than those shown in FIG. 1.

In various embodiments, SOC component 104 may be a uniprocessor system including one processor, or a multiprocessor system including several processors (e.g., two, four, eight, or another suitable number). CPU(s) 108 may implement any suitable instruction set architecture, and may be configured to execute instructions defined in that instruction set architecture. For example, in various embodiments CPU(s) 108 may be general-purpose or embedded processors implementing any of a variety of instruction set architectures (ISAs), such as the x86, PowerPC, SPARC, RISC, or MIPS ISAs, or any other suitable ISA. In multiprocessor systems, each of CPU(s) 108 may commonly, but not necessarily, implement the same ISA. CPU 108 may employ any microarchitecture, including scalar, superscalar, pipelined, superpipelined, out of order, in order, speculative, non-speculative, etc., or combinations thereof. CPU 108 may include circuitry to implement microcoding techniques. CPU 108 may include one or more processing cores each configured to execute instructions. CPU 108 may include one or more levels of caches, which may employ any size and any configuration (set associative, direct mapped, etc.).

In the example illustrated in FIG. 1, system memory 130 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 100 in a chip-on-chip configuration, a package-on-package configuration, or a multi-chip module configuration. In some embodiments, system memory 130 may store pixel data or other image data or statistics in various formats. Similarly, while the example system 100 illustrated in FIG. 1 includes persistent storage 128 for non-volatile storage of image data and/or other data used in the system, in other embodiments, the system may include other types of non-volatile memory (e.g. ROM) for those purposes.

Graphics processing unit (GPU) 120 may include any suitable graphics processing circuitry. Generally, GPU 120 may be configured to render objects to be displayed into a frame buffer (e.g., one that includes pixel data for an entire frame). GPU 120 may include one or more graphics processors that may execute graphics software to perform a part or all of the graphics operation, and/or hardware acceleration of certain graphics operations. The amount of hardware acceleration and software implementation may vary from embodiment to embodiment.

I/O devices 118 may include any desired circuitry, depending on the type of system 100. For example, in one embodiment, system 100 may be a mobile computing device (e.g. personal digital assistant (PDA), tablet device, smart phone, etc.) and the I/O devices 118 may include devices for various types of wireless communication, such as WiFi, Bluetooth, cellular, global positioning system, etc. In some embodiments, I/O devices 118 may also include additional storage, including RAM storage, solid state storage, or disk storage. In some embodiments, I/O devices 118 may include user interface devices such as additional display devices, including touch display screens or multi-touch display screens, keyboards, keypads, touchpads, scanning devices, voice or optical recognition devices, microphones, speakers, scanners, printing devices, or any other devices suitable for entering or accessing data by or within system 100.

In this example, image signal processor (ISP) 106 may include dedicated hardware that may facilitate the performance of various stages of an image processing pipeline, as described in detail herein. In some embodiments, ISP 106 may be configured to receive image data from image sensor 102, and to the process the data into a form that is usable by other components of system 100 (including display 116 or video encoder 124). In some embodiments, ISP 106 may be configured to perform various image-manipulation operations such as image translation operations, horizontal and vertical scaling, color space conversion or other non-warping image editing operations, and/or image stabilization transformations, as described herein. One embodiment of an image signal processor is illustrated in more detail in FIG. 3 and described below.

In the example illustrated in FIG. 1, interconnect 132 may be configured to facilitate communications between the various functional units included in SOC 104. In various embodiments, interconnect 132 may include any suitable interconnect circuitry such as meshes, network on a chip fabrics, shared buses, point-to-point interconnects, etc. In some embodiments, interconnect 132 may perform any necessary protocol, timing or other data transformations to convert data signals from one component (e.g., system memory 130) into a format suitable for use by another component (e.g., CPU(s) 108 or GPU 120). In some embodiments, interconnect 132 may include support for devices attached through various types of peripheral buses, such as a variant of the Peripheral Component Interconnect (PCI) bus standard or the Universal Serial Bus (USB) standard, for example. In some embodiments, the function of interconnect 132 may be split into two or more separate components, such as a north bridge and a south bridge, for example. In some embodiments, interconnect 132 may facilitate the communication of pixel data or other image data or statistics to various functional units in the appropriate formats.

In this example, network interface 110 may be configured to allow data to be exchanged between system 100 and other devices attached to one or more networks (e.g., carrier or agent devices) or between nodes or components of system 100. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 110 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available. In some embodiments program instructions stored in system memory 130 may be executed by CPU 108 and/or GPU 120 to provide various functions of system 100. In other embodiments, various functions may be performed by software components executing in memory on another device and communicating with the illustrated system via inter-computer communication. Some or all of these software components and/or any data structures described herein may be stored (e.g., as instructions or structured data) in system memory 130, in persistent storage 128, or may be stored on a non-transitory computer-readable medium or a portable article to be read by an appropriate drive. In some embodiments, instructions stored on a computer-accessible medium separate from system 100 may be transmitted to system 100 via transmission media or signals such as electrical, electromagnetic, or digital signals, conveyed via a communication medium such as a network and/or a wireless link. Various embodiments may further include receiving, sending or storing instructions and/or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 2:
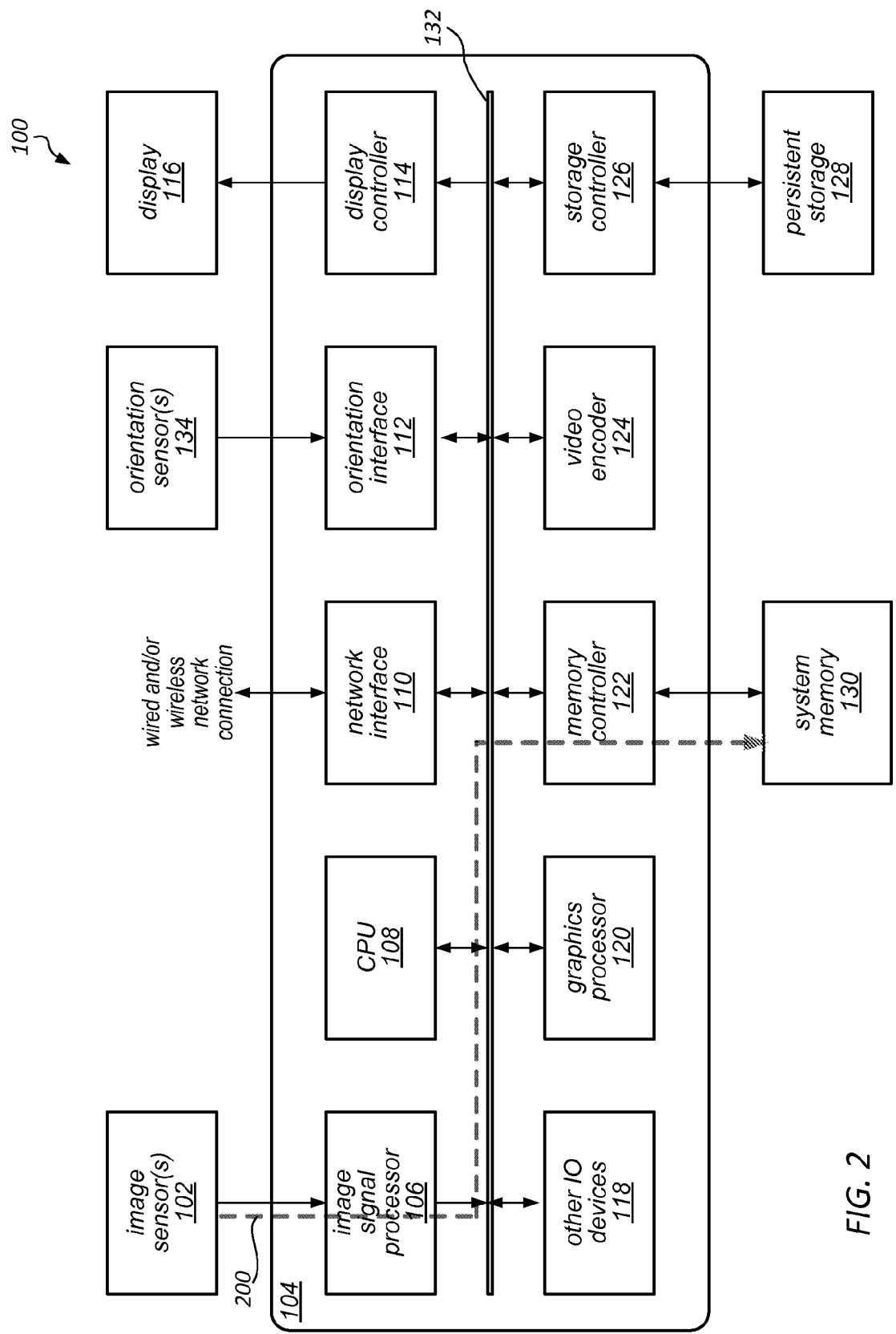
FIG. 2 is a logical block diagram illustrating an example data path in a system that may implement an image processing pipeline that performs auto filter extent management, according to some embodiments.

FIG. 2 is a block diagram illustrating a data path in a system that implements an image signal processor (specifically, in system 100 illustrated in FIG. 1), according to some embodiments. As illustrated by the dashed lines in this example, image data may pass from the image sensor (102), through the image signal processor (106) to system memory 130 (by way of interconnect 132 and memory controller 122). Once the image data has been stored in system memory 130, it may be accessed by video encoder 124, display 116 (e.g., by way of interconnect 132 and, in the case of display 116, display controller 114). For example, it may be accessed by display controller 114 in order to display a preview on display 116, or may be accessed by video encoder 124, which may encode the data in a format suitable for video recording to persistent storage 128 (e.g., for storage), or for passing the data to network interface 110 for transmission over a network (e.g., for a video conference) or elsewhere, in various embodiments.

In some embodiments graphics processor 120 may access, manipulate, transform and/or otherwise process image data, and thus additional read and write operations may be performed on system memory 130 beyond those illustrated in FIG. 2. Image data that is stored in system memory 130 may be accessed by GPU 120 (by way of interconnect 132 and memory controller 122), and, after GPU 120 has performed one or more image transformations on the image data, the image data may be written back to system memory 130 (again, by way of interconnect 132 and memory controller 122). Similar data paths may be employed in system 100 between system memory 130 and CPU 108 if image processing is instead performed by CPU 108 (e.g., by software executing on CPU 108). In some embodiments (though not illustrated) image data out from image signal processor 106 may be sent directly (via interconnect 132) to another functional component (e.g., CPU 120, graphics processor 120, other I/O devices 118, network interface 110, video encoder 124, storage controller 130, and/or display controller 114) without storing the image data to system memory 130.

Figure 3:
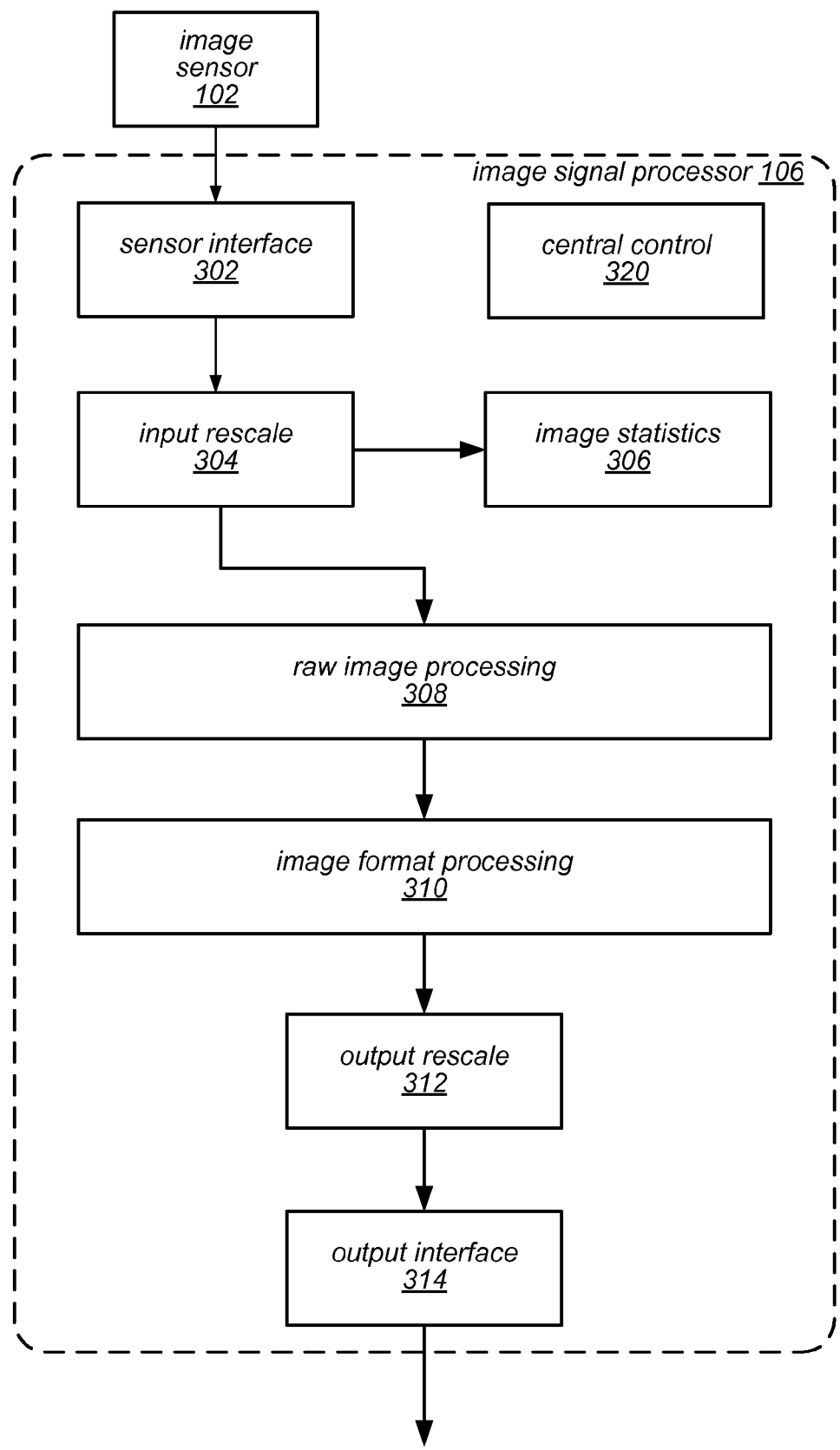
FIG. 3 is a logical block diagram illustrating an example image signal processor, according to some embodiments.

One embodiment of an image signal processing unit (ISP), such as image signal processor 106, is illustrated by the block diagram in FIG. 3. As illustrated in this example, ISP 106 may in various embodiments be coupled to an image sensor 102 (from which it receives image data). In this example, ISP 106 implements an image pipeline, i.e., a set of stages that process image information from creation (or capture) to output. For example, the various elements illustrated as components of ISP 106 process source data received from image sensor 102 through sensor interface 302 into image data usable by other stages in the pipeline (e.g., input rescale 304, image statistics 306, raw image processing 308, image format processing 310 or output rescale 312), by other components of a system that includes ISP 106 via output interface 314 (including those that access the transformed data from the system memory after it is written to the system memory via memory controller interface 122 or are provided the image data via interconnect 132 directly), and/or by other devices coupled to the system that includes ISP 106. Note that in some embodiments, the image signal processor 106 is a streaming device. In other words, pixels may be received by the image signal processor 106 from the image sensor 102 in raster order (i.e., horizontally, line by line) and may in general be processed through its various pipeline stages in raster order, until finally being output in raster order.

In various embodiments, image signal processor 106 may implement central control module 320. Central control module 320 may configure and start the processing of image data, in some embodiments. For example, central control module may implement performance monitors for logging clock cycles, memory latency, quality of service, and state information. Central control module 320 may update or manage control parameters for units, modules, stages, and/or other components of ISP 106, and may interface with sensor interface 302 to control the starting and stopping of the of the units, modules, stages, and/or other components. For example, in some embodiments, a unit, module, stage, and/or other component may go into an idle state during which programmable parameters may be updated by central control module 320. The unit, module, stage, and/or other component may then be placed into a run state, to perform one or more operations or tasks.

In various embodiments, ISP 106 may implement input rescale module 304. The input rescale module 304 operates on sensor (e.g., Bayer format) data, producing sensor (e.g., Bayer) output at a reduced resolution for the rest of the ISP 106 pipeline, which may reduce the power and bandwidth cost of image processing at the later stages, units, and/or modules of the ISP 106 pipeline when processing images to be output at lower resolutions than the full sensor resolution. The reduction in data provided by the input rescale module 304 allows the ISP 106 pipeline to produce high-quality output at reduced resolutions (for example, for video or smaller-resolution still images) from a high-pixel-count sensor. For example, the image rescale module 304 may convert Bayer format data from native sensor resolution (typically 8 megapixels (MP) or more) to video resolutions (typically 2 MP or less) by doing a rescale of the captured image data in the Bayer domain.

In some embodiments, input rescale module 304 may demosaic Bayer format image data received from image sensor 102, apply horizontal and vertical filtering to resample the image data, and then remosaic the resampled image data to generate downscaled Bayer format image data output for the remainder of the ISP 106 pipeline. In some embodiments of an input rescale module 304, the demosaic operation generates RGB pixel data, and horizontal filtering is applied to the RGB data to horizontally downscale the image. In some embodiments, input rescale module 304 may perform additional processing before and after the demosaic operation to, for example, handle pixel defects and filtering around highlight regions. In at least some embodiments, the RGB output of the horizontal filter operation may be converted to YCbCr, and the chroma portion of the YCbCr data may be reduced from chroma 4:4:4 to chroma 4:2:2. Vertical filtering is then applied separately to the luma and chroma data to vertically downscale the image. The chroma 4:2:2 data is then converted back to chroma 4:4:4, the YCbCr data is converted back to RGB data, and the RGB data is remosaiced to generate Bayer format data as output. In some embodiments, the vertical filtering path may be bypassed, and the RGB output of the horizontal filter operation may be remosaiced to generate Bayer format data as output.

In at least some embodiments of an ISP 106, the input rescale module 304 may be bypassed, or may be directed to perform a lesser amount resolution reduction, to allow the ISP 106 pipeline to process the captured image data at higher resolutions, for example for higher-quality still image photography. In some embodiments, the input rescale module 304 may perform some reduction in resolution for an image at the front of the ISP 106 pipeline. The ISP 106 pipeline may then process the image at the reduced resolution. At a later stage of the pipeline, for example at output rescale module 312, the image resolution may be further reduced to generate an image at a desired or required output resolution. Additionally, in some embodiments, output rescale module 312 may also be configured to perform (at least some portion of) one or more in-stream piecewise perspective transformations, as described herein.

In various embodiments, image signal processor 106 may implement image statistics module 306. Image statistics module 306 may perform various functions and collect information. For example image statistics module may, in some embodiments may perform sensor linearization, defective pixel replacement, black level compensation, lens shading correction, and inverse black level compensation, collecting image information as a result of the various operations. Other statistics, such as 3A statistics (Auto white balance (AWB), auto exposure (AE), auto focus (AF)), histograms (e.g., 2D color or component), or any other image data information may be collected or tracked. Thus, the previous examples are not intended to be limiting.

In various embodiments image signal processor 106 may implement raw image processing module 308. Raw image processing module 308 may, in various embodiments implement a variety of modules, units, and/or components to perform various operations, functions, or tasks on raw image data (e.g., Bayer format), in different orders, such as sensor linearization, black level compensation, fixed pattern noise reduction, temporal filtering, defective pixel correction, spatial noise filtering, lens shading correction, white balance gain, highlight recovery, and/or raw scaling. A sensor linearization unit may, in some embodiments, map non-linear image data to linear space. Black level compensation may be performed to provide digital gain, offset and clip independently for each color component Gr, R, B, Gb on the pixels image data (which may occur after sensor linearization). Fixed pattern noise reduction may be performed to remove offset fixed pattern noise and gain fixed pattern noise by subtracting a dark frame from an input image and multiplying different gains to pixels, in some embodiments. Temporal filtering may perform noise filtering based on pixel values from previous image frame. Defective pixel correction may determine or identify defective pixels, and may replace defective pixel values. Spatial noise filter may reduce noise in image data by averaging neighbor pixels that are similar in brightness. Lens shading correction may apply a gain per pixel to compensate for a dropoff in intensity roughly proportional to a distance from a lens optical center. White balance gains may provide digital gains for white balance, offset and clip independently for all color component Gr, R, B, Gb. Highlight recovery may estimate pixel values for those pixels that are clipped (or nearly clipped) from other channels. Raw scaling may scale down image data in a raw format (e.g., Bayer format). Please note that various examples and descriptions provided above are not intended to be limiting as to the various techniques or components implemented as part of raw image processing, but are instead merely provided as examples.

As noted above, in at least some embodiments, a temporal filter module, unit, or component may be implemented as part of raw image processing module 308. The temporal filter may perform noise filtering based on pixel values from a reference image frame. In some embodiments, the temporal filter may introduce a frame delay into the image processing pipeline of ISP 106 by providing the reference image frame instead of the current image frame. The frame delay may allow downstream processes, units, stages, or components time to gather more information for better analysis of image data, as well as allow downstream processes to be programmatically tailored to the image data. In various embodiments, the temporal filter may perform filtering based on a generated blending value for each pixel on a current image frame that is based on differences determined between neighboring pixels in the current image frame and a reference image frame. In some embodiments, the temporal filter may adjust blending values for pixels based on noise history maintained for the pixels. In some embodiments, the temporal filter may implement dynamic motion estimation and compensation for image data as it is received on the fly, so that a reference image frame may be shifted to align with a current frame before filtering.

In various embodiments, image signal processor 106 may implement image format processing module 310. Image format processing module 310 may, in various embodiments implement a variety of modules, units, and/or components to perform various operations, functions, or tasks, in different orders, such as demosaicing raw image data to RGB image format, local tone mapping, determining gain/offset/clip, color correction, 3D color lookup, RGB gamma mapping, color space conversion (e.g., to YCbCr), statistics collection, luma sharpening, chroma suppression, dynamic range compression, brightness, contrast and color adjustments, YCbCr gamma mapping, chroma decimation and chroma noise reduction. Demosaicing may interpolate missing color samples in image data. Local tone mapping may apply spatially varying local tone curves to image data. Gain, offset, and clip may be determined for each color component in RGB image data. Color correction may be performed using an RGB color correction matrix. RGB gamma mapping may provide a mapping between RGB values using a lookup table for gamma correction. Color space conversion may convert image data to another color format or space (e.g., RBG to YCbCr). Luma sharpening may sharpen luma values. Chroma suppression may attenuate chroma to gray (i.e. no color). Noise in chrominance channels may be filtered. Please note that various examples and descriptions provided above are not intended to be limiting as to the various techniques or components implemented as part of image format processing, but are instead merely provided as examples.

In some embodiments, image signal processor 106 may implement output rescale module 312. Output rescale module 312 may be implemented in hardware, software, firmware, and/or a combination of hardware, software and/or firmware, according to various embodiments. Output rescale module 312 may resample, transform and correct distortion on the fly as the ISP 160 processes image data. Output rescale module 312 may compute a fractional input coordinate for each pixel and uses this fractional coordinate to interpolate an output pixel via a polyphase resampling filter, in some embodiments. A fractional input coordinate may be produced from a variety of possible transforms of an output coordinate, such as resizing and/or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and GDC (e.g., geometric distortion correction may be performed via computing a radial distance from the optical center in order to index an interpolated radial gain table, and applying a radial perturbance to a coordinate to account for a radial lens distortion). Additionally, one or more transformations may be applied to image data simultaneously as it passes through output rescale module 312, according to some embodiments.

Regardless of how the input coordinate is generated, the result of the hardware processing is a coordinate within the line buffers. In some embodiments, this coordinate may have a fractional value which may be used to do interpolation to produce an output pixel. For example, if it is determined that the coordinate is (10.5, 1.5), the hardware may be configured to average the value of the four pixels that represent pixels 10 and 11 from lines 1 and 2. While the path through the input may be a diagonal line, the hardware may be limited in the amount of vertical displacement it can handle by the number of line buffers that are implemented. For example, if N is 25, the hardware may only be able to handle a 25-pixel vertical displacement across the entire horizontal width. If the hardware is handling 1,920-pixel-wide HD video, this corresponds to a maximum rotation of about 0.75 degrees.

Output rescale module 312 may, in various embodiments, apply transforms to image data as it is processed at output rescale module 312. For example, in some embodiments, output rescale module 312 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale module 312 may include horizontal and vertical scaler components. The vertical portion of the design may implement series of image data line buffers to hold the "support" needed by the vertical filter. As ISP 106 may be a streaming device, only the lines of image data in a finite-length sliding window of lines may be available for the filter to use. In some embodiments, a vertical support window may represent, or include) a set of line buffers to hold image pixel lines for use when performing any of various image processing operations (such as image resampling, piecewise perspective transforms and geometric distortion correction, among others). Once a line has been discarded to make room for a new incoming line, the line may be unavailable. Output rescale module 312 may statistically monitor computed input Y coordinates over previous lines and use it to compute a set of lines (e.g., a set of appropriate, required and/or optimal lines) to hold in the vertical support window. For each subsequent line, output rescale module 312 may generate a best guess of where to center the vertical support window.

Note also that, in various embodiments, the functionally of units 302-314 may be performed in a different order than the order implied by the order of these functional units in the image processing pipeline illustrated in FIG. 3, or may be performed by different functional units than those illustrated in FIG. 3.

Figure 4:
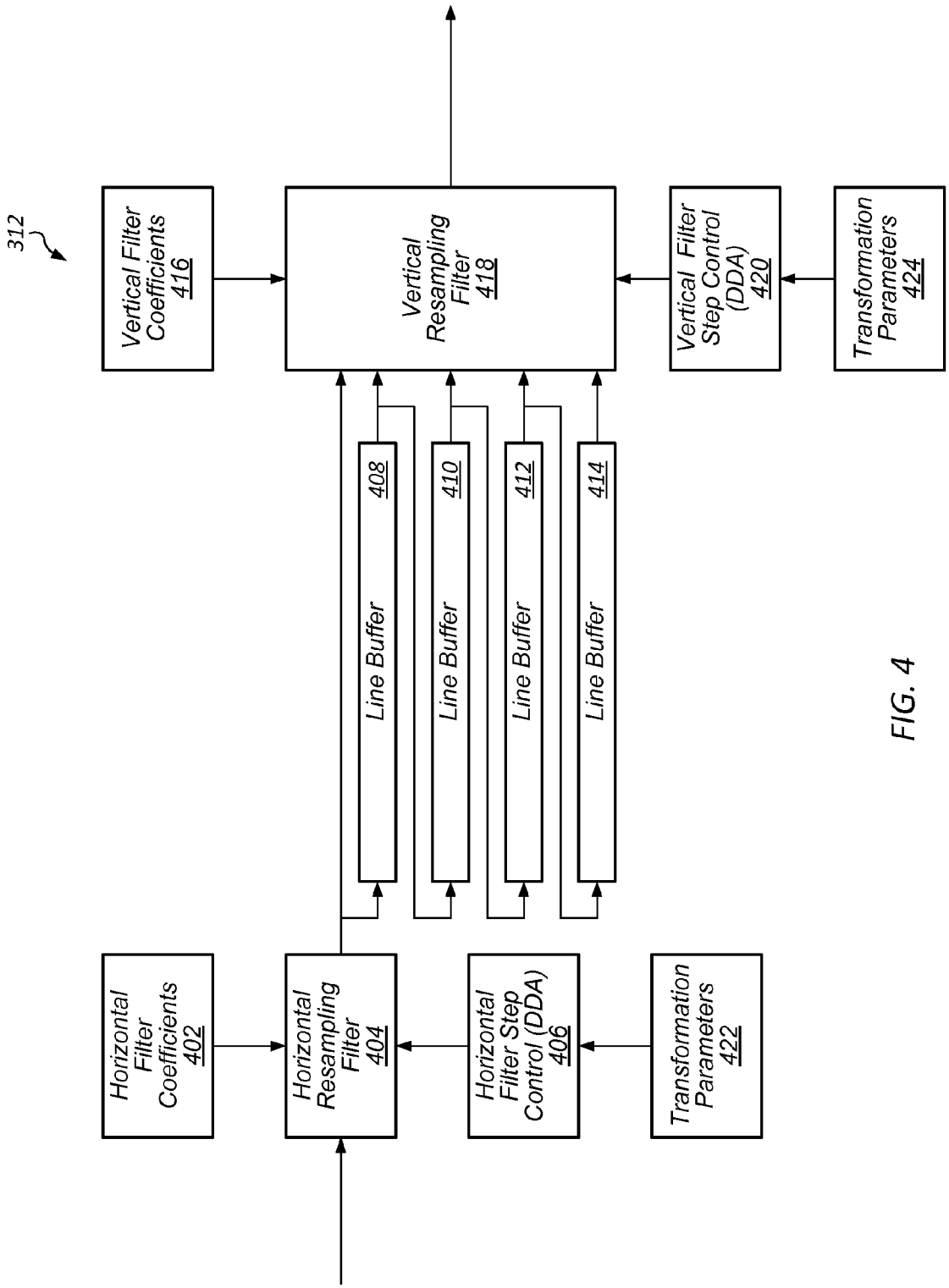
FIG. 4 is a logical block diagram illustrating one example of an output rescale module capable of performing auto filter extent management, according to one embodiment.

One embodiment of an output rescaling unit of an image signal processor is illustrated by the block diagram in FIG. 4. As illustrated in this example, an output rescaling unit (such as output rescaling unit 312 illustrated in FIG. 3) may include a horizontal resampling filter 404, multiple line buffers (shown as line buffers 408, 410, 412, and 414), and a vertical resampling filter 418. As shown in FIG. 4, horizontal resampling filter 404 may receive image data 400 from a previous stage in the ISP pipeline, and may also receive horizontal filter coefficients 402 as inputs. Horizontal resampling filter 404 may walk through the image data (writing pixels into the multiple line buffers 408-414) performing the horizontal portion of the transformation under the control of horizontal filter step control unit 406. Note that in some embodiments the horizontal filter may include storage (e.g., a small number of registers) for some amount of horizontal "support" (i.e., pixels in the neighborhood of the interpolation position) that is used in generating its output. Similarly, vertical resampling filter 418 may receive vertical filter coefficients 416 as inputs, and may process the image data in the multiple line buffers, under the control of vertical filter control step unit 420. Since the vertical filter operates on columns of pixels, and since the pixels arrive in raster order, the vertical filter may use the line buffers (i.e., buffering up several lines of pixels data) for its "support".

As noted above, an output rescale module, such as output rescale module 312, may include separable horizontal and vertical scale components. In some embodiments, a vertical portion may use a series of line buffers to hold the 'support' needed by the vertical filter. Image rotation, perspective transform and geometric distortion correction may require additional lines of buffering to handle image roll, perspective and radial distortion, than may be required for just vertical rescaling without image rotation, perspective transform and geometric distortion correction. For example, image roll and perspective may cause the path of the input coordinates to walk across the source in a diagonal path. This in turn may require the hardware to hold in the line buffers a rectangular region of the source that includes all the pixels associated with the diagonal input path for a given output pixel line, along with the surrounding support lines required by the vertical filter.

In some embodiments, the vertical filter's collection of line buffers may operate as a first-in-first-out (FIFO) queue. Since output rescale module 312 may be streaming in nature, only the lines in the finite-length sliding window of lines (e.g., the line buffers) may be available for use when generating an output pixel line. Once a line has been discarded from the line buffers to make room for a new incoming line, it may be unavailable from then on. This may limit the programmability of a transform. For example, if a transform requires too much roll, the diagonal path may exceed the number of lines available in the line buffers.

In the example embodiment illustrated by FIG. 4, horizontal filter coefficients 402 and vertical filter coefficients 416 may be tables containing weightings for the corresponding resampling filters. For example, once horizontal filter step control unit 406 (e.g., a DDA) has determined the fractional pixel position for a given output pixel (which may be referred to as the "filter phase"), this position information may be used to look up an appropriate set of filter weights within horizontal filter coefficients 402 to apply to its support to produce an interpolated pixel for the output. Similarly, the vertical filter step control unit 420 may look up an appropriate set of filter weights within vertical filter coefficients 416 to apply to its support to produce an interpolated output pixel. Note that in other embodiments, horizontal and/or vertical filter weightings may not be stored in tables, but may be computed on an as-needed basis. For example, in some embodiments, elements 402 and/or 416 of FIG. 4 may represent circuitry that implements a simple interpolator. One such interpolator may use two pixels of support and may use weights of F and 1-F to interpolate a fractional value of F (between 0.0 and 1.0). In other embodiments, elements 402 and/or 416 may implement more complex filters, some of which may look up their filter coefficients in a pre-computed table.

The image data in the multiple line buffers 408-414 may thus be processed to perform various types of transformations (e.g., translations, horizontal or vertical scaling, image resampling, piecewise perspective transforms, geometric distortion correction, image stabilization transformations, etc.). The output rescale unit 312 may then write out the transformed image data 425 to system memory (e.g., through memory controller 122).

As noted above, an output rescale module, such as output rescale module 312, may compute an estimated set of lines to hold in the vertical support window for use when performing transformations (e.g., image resampling, piecewise perspective transforms, geometric distortion correction, etc.). For example, in some embodiments, output rescale module 312 may statistically monitor the computed input Y coordinates over the previous lines (e.g., image pixel lines that have already been processed by output rescale module 312) and compute an (potentially optimal) set of lines to hold in the vertical support window (e.g., a set of line buffers). As each output pixel line is generated, output rescale module 312 may compute the minimum and maximum values of Y generated by the coordinate transform across that line.

For instance, in some embodiments, output rescale module 312 may generate one or more input Y coordinates computed for each pixel of the generated output pixel line and determine the minimum and maximum of those computed coordinates. The minimum and maximum input Y coordinates may then be averaged to determine the center of the support for that line. In other words, output rescale module 312 may determine which line in the vertical support window (e.g., the line buffers) was the centermost line of the lines used to generate the current output pixel line (e.g., as input for one or more image transformations).

Output rescale module 312 may compute a center value for each generated output pixel line. Additionally, output rescale module 312 may determine a line-to-line step value, such as by taking difference between the center values for the current output pixel line and the center value for the output pixel line generated just prior to the current output pixel line.

Output rescale module 312 may then add the line-to-line step value to the center value for the current output pixel line to determine (and/or estimate) a center value for the next (not yet generated) output pixel line. Output rescale module 312 may then use the estimated center value to set the center of the available vertical support (e.g., the particular lines in the line buffers available for performing transformation when generating the next output pixel line).

In some embodiments, output rescale module 312 may be streaming in nature—that is output rescale module may have little or no control over the speed at which image data is supplied from upstream processing (e.g., performed by previous stages in the ISP pipeline). Thus, rather than deciding which input image pixel lines to store in the line buffers in order to generate a particular output pixel line, output rescale module 312 may use the estimated center value to determine when the appropriate input image pixel lines are in the line buffers, and therefore when to begin generating the next output pixel line. In other words, in some embodiments, output rescale module 312 may not determine when to add (and discard) input pixel lines from the line buffers, but may determine when the appropriate lines are in the buffer to generate a particular output pixel line.

Figure 5:
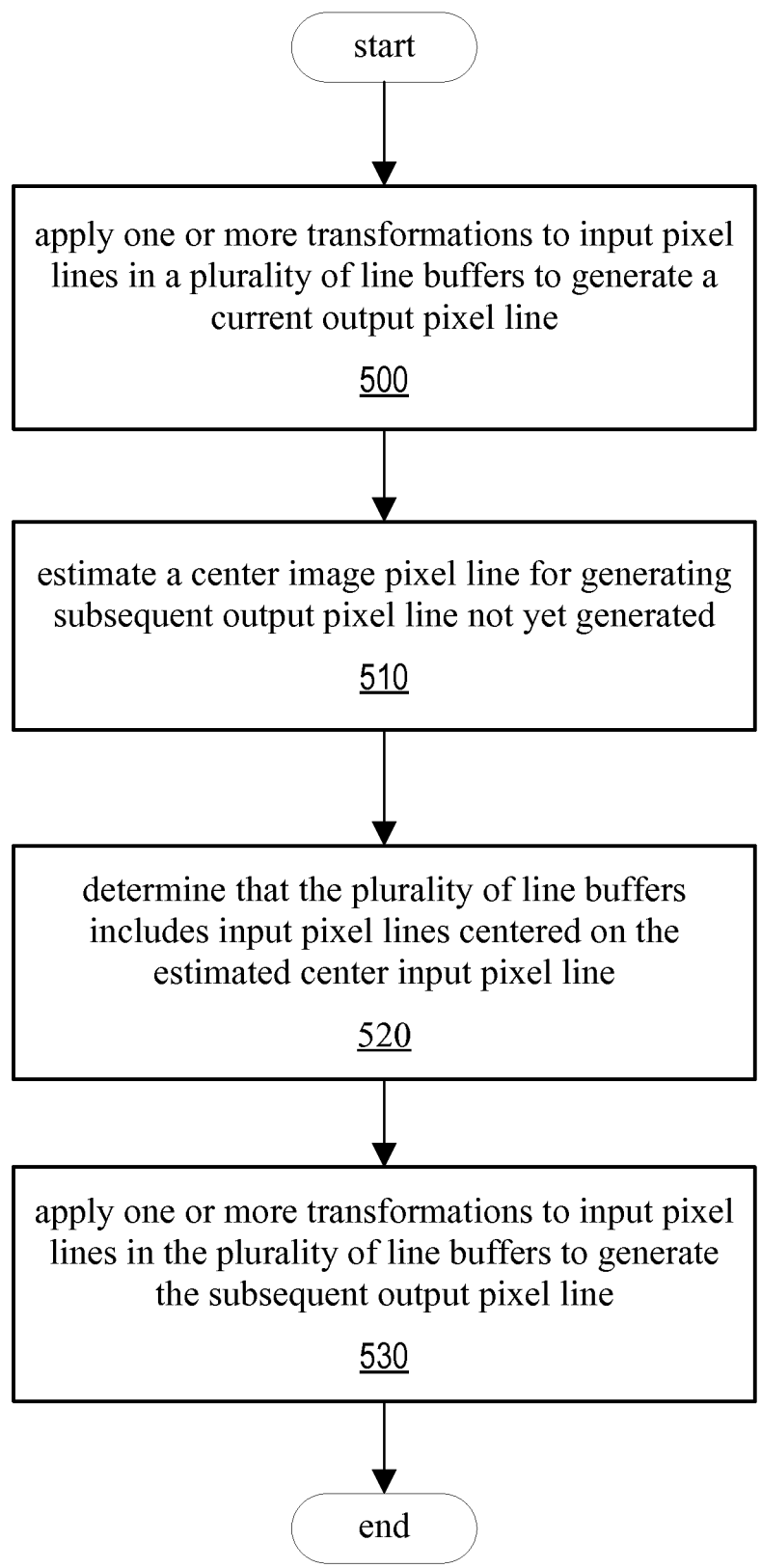
FIG. 5 is a flowchart illustrating one embodiment of a method for auto filter extent management, as described herein.

FIG. 5 is a flowchart illustrating one embodiment of a method for auto filter extent management, as described herein. As shown in block 500, an output rescale module, such as output rescale module 312 may be configured to apply one or more transformations to input pixels lines in a plurality of line buffers to generate a current output pixel line, according to one embodiment. As described above, Output rescale module 312 may, in various embodiments, apply transforms to image data to generate modified output image data. In some embodiments, a vertical support window may represent, or include, a set of line buffers to hold image pixel lines for use when performing any of various image processing operations (such as image resampling, piecewise perspective transforms and geometric distortion correction, among others). For example, output rescale module 312 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame.

As shown in block 510, in some embodiments output rescale module 312 may be configured to estimate a center image pixel line for generating a subsequent output pixel line that has not yet been generated. For example, in one embodiment, output rescale module 312 may statistically monitor computed input Y coordinates over previous lines and use it to compute a (required or optimal) set of lines to hold in the vertical support window. For each subsequent line, output rescale module 312 may generate a best guess of where to center the vertical support window.

Additionally, output rescale module 312 may be configured to determine that the plurality of line buffers includes input pixel lines centered on the estimated center (e.g. for the subsequent line), as shown in block 520 according to one embodiment. As noted above, the vertical filter's collection of line buffers may operate as a first-in-first-out (FIFO) queue. Since output rescale module 312 (as well as the entire ISP pipeline) may be streaming in nature, only the lines in the finite-length sliding window of lines (e.g., the line buffers) may be available for use when generating an output pixel line. Once a line has been discarded from the line buffers to make room for a new incoming line, it may be unavailable from then on.

Thus, in some embodiments, output rescale module 312 may have little or no control over the speed at which image data is supplied from upstream processing (e.g., performed by previous stages in the ISP pipeline). Output rescale module 312 may use the estimated center value to determine when the appropriate input image pixel lines are in the line buffers, and therefore when to begin generating the next output pixel line. In other words, in some embodiments, output rescale module 312 may not determine when to add (and discard) input pixel lines from the line buffers, but may determine when the appropriate lines are in the buffer to generate a particular output pixel line.

In other embodiments, however, output rescale module 312 may have control over when input pixel lines are fed into the line buffers and output rescale module 312 may determine which input lines to feed into the line buffers in order to generate the next output pixel line.

In some embodiments, output rescale module 312 may be configured to apply one or more transformations to the input pixel lines in the plurality of line buffers to generate the subsequent output pixel line, as shown in block 530. In other words, output rescale module 312 may be configured to determine when the line buffers (e.g., which may work in a FIFO manner) include input pixel lines needed for the transformations to be applied to the next output pixel line to be generated. For example, if the estimate center input pixel line is in the line buffers in (or near) the middle of all the input pixel lines current in the line buffers, output rescale module 312 may determine that the appropriate lines are available and may generate the next output pixel line.

Figure 6:
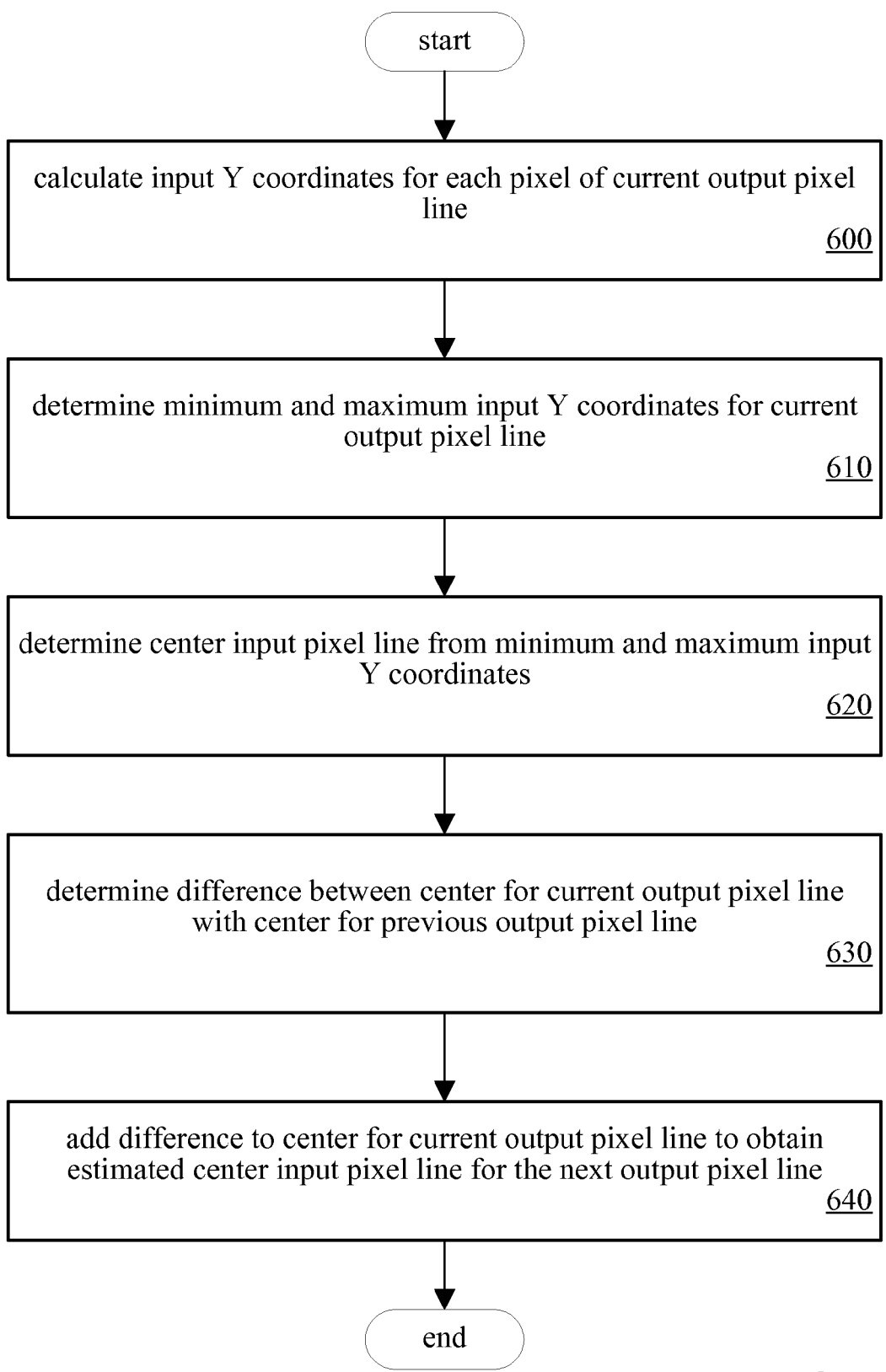
FIG. 6 is a flowchart illustrating one embodiment of a method for determining an estimated center input pixel line of an output pixel line as part of auto filter extent management.

FIG. 6 is a flowchart illustrating one embodiment of a method for determining an estimated center input pixel line of an output pixel line as part of auto filter extent management. When determine an estimated center input line for a subsequent output pixel line, output rescale module 312 may be configured to calculate input Y coordinates for each pixel of the current output pixel line, as shown in block 600. In some embodiments, the calculated input Y coordinates may reference individual pixel lines of the input image.

For instance, the following pseudo code represents one possible example of computing Y coordinates (for the luminance channel) for each output pixel:

```
for(i = 0; i < OutHeight; i++)
{
    for(j = 0; j ≤ InWidth; j++)
    {
        // Compute position relative to optical center (4 fractional bits)
        xcoord = (j << 4) - OptCenterXO;
        ycoord = ((YDDAVert + 0x80000) >> 20) - OptCenterY0;
        // compensate for previous down scaling (7 fractional bits)
        xcoord_resc = abs(xcoord) * (PrescaleX+1);
        ycoord_resc = abs(ycoord) * (PrescaleY+1);
        // round to 2 fractional bits
        xcoord_resc = (xcoord_resc + 0x10) >> 5;
        ycoord_resc = (ycoord_resc + 0x10) >> 5;
        // crop to 14 bits (12.2)
        if(xcoord_resc > 0x3fff)
            xcoord_resc = 0x3fff;
        if(ycoord_resc > 0x3fff)
            ycoord_resc = 0x3fff;
        // compute radius squared and convert to double precision
        rsquared = (xcoord_resc * xcoord_resc) + (ycoord_resc * ycoord_resc);
        rsquared_dbl = (double)rsquared/4.0;
        // round the mantissa to simulate hardware implementation
        rsquared_dbl = roundmant(rsquared_dbl, 14);
        // compute 1/radius if radius squared is non-zero
        if(rsquared_dbl != 0.0)
        {
            // compute 1/radius and round mantissa to 14 bits to simulate
            hardware
            recipr_dbl = 1.0/sqrt(rsquared_dbl);
            recipr_dbl = roundmant(recipr.dbl, 14);
            // compute radius and scale by RadScale
            radius_dbl = rsquared_dbl * recipr_dbl;
            radius.dbl *= (double)(0x2 << RadScale);
            // round radius to integer and clip to 16320
            GDCLutIndex = (int)(radius_dbl + 0.5);
            if(GDCLutIndex > 0x3fc0)
                GDCLUTIndex = 0x3fc0;
            // use GDCLutIndex[5:0] to interpolate between entries GDMem
            entries
            gdc_index = GDCLUTIndex >> 6;
            gdc_frac = GDCLUTIndex & 0x3f;
            displr = ((64-gdc_frac) * GDCLUT[gdc_index] + gdc_frac * GDCLUT[gdc_index+1] + 32) >> 6;
            // compute vertical component of displacement
            cosine_dbl = (double)ycoord/16.0 * recipr_dbl;
            cosine = (int)(cosine_dbl * pow(2.0, 12.0) + 0.5);
            displv = ((displr * cosine) + 0x80000) >> 16;
        }
        else
            displv = 0;
        // add vertical displacement to vertical DDA and round to 4
        fractional bits
        yvpointer = ((YDDAVert + 0x80000) >> 20) + displv;
        yvpointer += (~VertNumTaps & 0x1) << 3;
        // convert pointer to index and phase
        yvindex = yvpointer >> 4;
        yvphase = yvpointer & 0xf;
        // update maximum pointer
        if(yvindex > maxline)
            maxline = yvindex;
        //Generate an output pixel centered on input pixel(j, yvindex)
        vertically
        //filtered using yvphase and maxline
    }
    YDDAVert += DDAStepYVert<<8;
}
```

Note that in the above pseudo code, the number of line buffers available to the vertical filter is (12<<lbmode)-1, as one example. The newest line available in the line buffers may be considered:

maxline+(VertNumTaps+1)/2 while the oldest line available may be considered:

maxline+(VertNumTaps+1)/2-(12<<lbmode)+2

As shown in block 610, output rescale module 610 may be configured to determine the minimum and maximum input Y coordinates for the current pixel line. For example, output rescale module 312 may statistically monitor the computed input Y coordinates over the current line and as each output pixel line is generated, output rescale module 312 may compute the minimum and maximum values of Y generated by the coordinate transform across that line.

Output rescale module 312 may be configured to determine a center input pixel line from the minimum and maximum input Y coordinates, as shown in block 620. For example, in one embodiment, output rescale module 612 may average the determined minimum and maximum values to obtain a center input pixel line. Output rescale module 312 may also determine the difference between the input center line for the current output pixel line and the center line for the previous output line. The difference between the center lines for two adjacent output pixel lines may be referred to as a line-to-line step value herein. For example, output rescale module 312 may be configured to record, store, or otherwise remember which input line was determined to be the center for the current output line and use that to determine the difference between the center lines of two adjacent output lines.

Depending on the exact nature of the captured image and the transformation being used, two output pixel lines may require input pixel lines that are centered a number of input lines apart. As one example, a one output pixel line may require a set of input lines centered on the $15^{th}$ pixel line of the captured image, while the next output pixel line may require a set of input lines centered on the $17^{th}$ pixel line of the captured image. Thus, output rescale module 312 may determine a line-to-line step value of 2 (e.g., 17–15). Note that the above example is merely one possible example and the actual center lines used may vary from line to line and from embodiment to embodiment.

Output rescale module 312 may then add the difference (e.g., the line-to-line step value) to the center line for the current output pixel line to obtain the estimated center input pixel line for the next (subsequent) output pixel line to be generated, as shown in block 640 and according to some embodiment. For instance, using the above example, output rescale module 312 may add 2 (e.g., the line-to-line step value) to 17 (e.g., the current center input pixel line) to obtain 19 as the estimated center input pixel line for use when the next output pixel line to be generated.

While the above example referred to integer coordinates for the lines and the step value, in some embodiments fractional coordinates may be used to compute the center value and the step value. The resulting estimated value may then be rounded to an integral coordinate (e.g., since the line buffer may be accessed using integral lines).

Thus, output rescale module 312 may statistically monitor the computed input Y coordinates over the previous lines (e.g., image pixel lines that have already been processed by output rescale module 312) and compute an (potentially optimal) set of lines to hold in the vertical support window (e.g., a set of line buffers).

The following pseudo code represents one possible example for determining an estimated center value, as described herein.

```
Next_Line_Y = Prev_Line_Y + Line_to_Line_Step // estimate next
filter center
Filter_Center_Y = round_to_int( Next_Line_Y )   // round to
nearset source line
            // ... filter using Filter_Center_Y, measure Min_Y and Max_Y
Cur_Line_Y = ( Min_Y + Max_Y ) / 2       // compute observed filter
center
Line_to_Line_Step = Cur_Line_Y − Prev_Line_Y         //
compute line-to-line step
Prev_Line_Y = Cur_Line_Y        // save for next line
```

Additionally, in some embodiments, output rescale module 312 may use predetermined (or calculated) initial values for the center value and/or line-to-line step value to be used when processing the first (or first few) pixel lines. In other words, initial values may be used until output rescale module 312 has processed enough pixel lines to compute estimated center values for subsequent lines. For instance, values for Prev_Line_Y and Line_to_Line_Step (in the above pseudo code) into programmable registers. Continuing the above pseudo code example:

```
        Prev_Line_Y = (DDAY_Init − DDAY_Step) >> 12
        Line_To_Line_Step = DDAY_Step >> 12
```

The above pseudo code may set initial values to be used when estimating the center input lines for the first output lines, when warping and GDC are not enabled, according to one embodiment. In an embodiment in which warping may be enabled, these value may be computed based on the endpoints of the previous and next line, as in the following pseudo code:

```
Compute_Y( x, y ) {
   int y = DDAY_Init + DDAY_StepX * x + DDAY_StepY * y
   int w = (1 << 24) + DDAWY_Init + DDAWY_StepX * x +
   DDAWY_StepY * y
   return (y << 12) / w;      // compute 16.4 from 30.16 / 1.24
}
ave_cur = ( Compute_Y( 0, 0) + Compute_Y( InputWidth − 1, 0 ) / 2
ave_prev = ( Compute_Y( 0, −1 ) + Compute_Y( InputWidth − 1, −1 ) / 2
PrevLineY = ave_prev
LineToLineStep = ave_cur − ave_prev
```

GDC may make this more complicated in some embodiments and may require evaluating the top lines at multiple points. In general, however, the line-to-line change in GDC may be considered small, and the GDC offset may be applied as a static offset to the PrevLineY value based on an average GDC displacement across the line, according to some embodiments. Alternatively, in other embodiments, the above computation may be used, but with multiple sample points (left, right and middle, etc.), to compute the line center estimates (e.g., using (Max+Min)/2).

Additionally, in some embodiments, the transformations (and/or the transformation parameters) used to process image data may change relatively slowly from line to line and therefore the estimated center values may avoid image quality degradation.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. An apparatus, comprising:
   an image sensor;
   system memory; and
   an image signal processor, wherein the image signal processor comprises a output rescale module;
   wherein the output rescale module is configured to:
      receive image data for an image captured by the image sensor, wherein the image data is received as a stream of pixels, in raster order;
      gather input pixel lines of the stream of pixels into a plurality of line buffers, wherein each input pixel line pixels corresponding to a line of pixels of the captured image;
      apply one or more image transformations on one or more of the input pixel lines in the plurality of line buffers to generate a current output pixel line;
      estimate a center input pixel line for generating a subsequent output pixel line, wherein the center input line is one of the input pixel lines of the stream of pixels;
      determine that the plurality of line buffers includes input pixel lines centered on the estimated center image pixel line; and
      apply one or more other transformations to input pixel lines in the plurality of line buffers to generate the subsequent output pixel line, wherein the one or more other transformations are applied in response to determining that the plurality of line buffers includes input pixel lines centered on the estimated center image pixel line.

2. The apparatus of claim 1, wherein the output rescale module is further configured to:
   add one or more input pixel lines to the plurality of line buffers; and
   remove a respective one or more input pixel lines from the plurality of line buffers;
   wherein the one or more input pixel lines are added and the respective one or more input pixel lines are removed after said estimating and prior to said determining.

3. The apparatus of claim 1, wherein the output rescale module is further configured to write out the current output pixel line to system memory.

4. The apparatus of claim 1, wherein the output pixel line comprises a plurality of pixels, and wherein to estimate the center input pixel line the output rescale module is further configured to:
- calculate input Y coordinates of one or more of the transformations applied to the input pixel lines for each pixel of the current output pixel line.

5. The apparatus of claim 4, wherein to estimate the center input pixel line the output rescale module is further configured to:
- determine a minimum Y coordinate of the input Y coordinates calculated for the output pixel line; and
- determine a maximum Y coordinate of the input Y coordinates calculated for the output pixel line;
- wherein the estimated center input pixel line is based, at least in part on and average of the minimum and maximum Y coordinates.

6. The apparatus of claim 4, wherein to estimate the center input pixel line the output rescale module is further configured to:
- determine a center pixel line for the current output pixel line; and
- add a difference between the center pixel line for the current output pixel line and a center pixel line for a previous output pixel line to the center pixel line for the current output pixel line to obtain the estimated center input pixel line for the subsequent output pixel line.

7. The apparatus of claim 4, wherein to calculate the input Y coordinates, the output rescale module is further configured to compute a fractional input coordinate for each pixel of the current output pixel line.

8. The apparatus of claim 7, wherein each fractional input coordinate is based, at least in part, on at least one of:
- a vertical scaling transform;
- a rotation transform;
- a shearing transform;
- a perspective transform; or
- a geometric distortion correction.

9. A method, comprising:
- applying, by an output rescale module of an image signal processor, one or more image transformations to input pixel lines in a plurality of line buffers to generate a current output pixel line;
- estimating, by the output rescale module, a center input pixel line for generating a subsequent output pixel line, wherein the center input line is one of the input pixel lines in the plurality of line buffers, and wherein the plurality of line buffers includes approximately the same number of input pixels above the center input line as below the center input line, and wherein the subsequent output pixel line has not been generated at the time of said estimating;
- determining, by the output rescale module, that the plurality of line buffers includes input pixel lines centered on the estimated center image pixel line; and
- applying, by the output rescale module in response to said determining, one or more other transformations to input pixel lines in the plurality of line buffers to generate the subsequent output pixel line.

10. The method of claim 9, further comprising:
- adding one or more input pixel lines to the plurality of line buffers; and
- removing a respective one or more input pixel lines from the plurality of line buffers;
- wherein said adding and said removing occur after said estimating and prior to said determining.

11. The method of claim 9, wherein the output pixel line comprises a plurality of pixels, wherein said estimating comprises calculating input Y coordinates of one or more of the transformations applied to the input pixel lines for each pixel of the current output pixel line.

12. The method of claim 11, wherein said estimating further comprises:
- determining a minimum Y coordinate of the input Y coordinates calculated for the output pixel line; and
- determining a maximum Y coordinate of the input Y coordinates calculated for the output pixel line;
- wherein the estimated center input pixel line is based, at least in part on and average of the minimum and maximum Y coordinates.

13. The method of claim 11, wherein said estimating further comprises:
- determining a center pixel line for the current output pixel line; and
- adding a difference between the center pixel line for the current output pixel line and a center pixel line for a previous output pixel line to the center pixel line for the current output pixel line to obtain the estimated center input pixel line for the subsequent output pixel line.

14. The method of claim 11, wherein said calculating comprises computing a fractional input coordinate for each pixel of the current output pixel line.

15. The method of claim 14, wherein computing the fractional input coordinate for each pixel comprises computing at least one of:
- a vertical scaling transform;
- a rotation transform;
- a shearing transform;
- a perspective transform; or
- a geometric distortion correction.

16. The method of claim 9, further comprising writing out the current output pixel line to system memory subsequent to said applying the one or more other transformations.

17. A system, comprising:
- a device configured to capture image data for an image; and
- an image signal processor, wherein the image signal processor is configured to:
  - perform one or more image transformations on the captured image data to produce modified image data, wherein for each pixel of a respective line of the modified image data one or more image transformations are performed on one or more lines of pixels in the plurality of line buffers;
  - determine, for each line of the modified image data, a plurality of lines of pixels of the captured image data to hold in a plurality of line buffers for use when performing one or more other image transformations for the respective line of the modified image data;
  - estimate a center input pixel line for generating a respective output pixel line, wherein the center input pixel line is one of the plurality of lines of pixels; and
  - determine that the plurality of line buffers includes a determined plurality of lines of pixels centered around the estimated center input pixel line for use when performing the one or more other image transformations for the respective output pixel line.

18. The system of claim 17, wherein the image signal processor is further configured to apply the one or more other image transformations to the input pixel lines in the plurality of line buffers to generate the respective output pixel line.

19. The system of claim 18, wherein to estimate a center input pixel line for a respective line of the modified image data, the image signal processor is configured to:

determine an average center pixel line for two previous lines of the modified image data for which one or more image transformations have already been performed; and add a difference between two average center pixel lines for the two previous lines to the average center pixel line for a later of the two previous lines.

20. The system of claim 18, wherein the image signal processor is further configured to:

add an additional line of pixels of the captured image data to the plurality of line buffers;

remove a respective line of pixels from the plurality of line buffers; and wherein the additional line of pixels is added and the respective line of pixels is removed after said estimating the center input pixel line and prior to said determining that the plurality of line buffers includes a determined plurality of lines of pixels centered around the estimated center input pixel line for use when performing the one or more other image transformations for the respective output pixel line.

* * * * *